United States Patent
Wang (12) 
(10) Patent No.: US 11,964,630 B2
(45) Date of Patent: Apr. 23, 2024

(54) ALL-TERRAIN VEHICLE

(71) Applicant: SEGWAY TECHNOLOGY CO., LTD., Changzhou (CN)

(72) Inventor: Mingyong Wang, Changzhou (CN)

(73) Assignee: SEGWAY TECHNOLOGY CO., LTD., Changzhou (CN)

( * ) Notice: Subject to any disclaimer, the term of this patent is extended or adjusted under 35 U.S.C. 154(b) by 137 days.

(21) Appl. No.: 17/883,755

(22) Filed: Aug. 9, 2022

(65) Prior Publication Data

US 2023/0050582 A1 Feb. 16, 2023

(30) Foreign Application Priority Data

| Aug. 11, 2021 | (CN) | 202110921315.X |
| Aug. 11, 2021 | (CN) | 202121875313.3 |
| Aug. 16, 2021 | (CN) | 202121916819.4 |

(51) Int. Cl.
- B60R 7/04 (2006.01)
- B60N 2/015 (2006.01)
- B60N 2/64 (2006.01)
- B62D 21/02 (2006.01)

(52) U.S. Cl.
CPC .............. *B60R 7/043* (2013.01); *B60N 2/015* (2013.01); *B60N 2/64* (2013.01); *B62D 21/02* (2013.01)

(58) Field of Classification Search
CPC .......... B60R 7/043; B60N 2/015; B60N 2/64; B60N 21/02
See application file for complete search history.

(56) References Cited

U.S. PATENT DOCUMENTS

| 10,730,444 B2 * | 8/2020 | Welch .................. B60N 2/3011 |
| 2007/0182230 A1 * | 8/2007 | Bhatia ..................... B60R 7/043 |
| | | 297/378.1 |
| 2017/0106773 A1 * | 4/2017 | Aguilar Ruelas ....... B60R 22/34 |

FOREIGN PATENT DOCUMENTS

| CN | 210309896 U | 4/2020 |
| CN | 210961095 U | 7/2020 |
| CN | 213619338 U | 7/2021 |
| GB | 287811 A | 3/1928 |
| JP | 2006-176040 A | 7/2006 |

(Continued)

OTHER PUBLICATIONS

Chinese Office Action dated Dec. 14, 2022 for Application No. 202110921315.X, 9 pages.

*Primary Examiner* — Faye M Fleming
(74) *Attorney, Agent, or Firm* — Frost Brown Todd LLP (57) ABSTRACT

An all-terrain vehicle includes a frame, a cockpit, wheels, suspension assemblies, an engine, a seat support, a cushion, and a storage box. The frame includes a longitudinal beam extending along a front-rear direction and a vertical beam extending upwards from the longitudinal beam. The cockpit is arranged in a middle portion of the frame. The wheels are connected to left and right sides of the frame. The suspension assemblies are connected between the wheels and the frame. The engine is disposed on the frame. The seat support is disposed on the frame, and includes a cushion support and a backrest support both arranged in the cockpit, and the backrest support is located above the cushion support. The cushion is mounted on the cushion support. The storage box is detachably mounted on the backrest support, and the storage box and the cushion form a seat that can be leaned on.

20 Claims, 8 Drawing Sheets

(56) References Cited

FOREIGN PATENT DOCUMENTS

| | | | |
|---|---|---|---|
| JP | 2007112423 A * | 5/2007 | |
| JP | 2010-213795 A | 9/2010 | |
| JP | 2012-101661 A | 5/2012 | |
| WO | WO-2009035789 A1 * | 3/2009 | ........... B60N 2/3013 |

* cited by examiner

ALL-TERRAIN VEHICLE

CROSS-REFERENCE TO RELATED APPLICATION

This application claims priority to and benefits of Chinese Patent Application Serial No. 202121916819.4, filed on Aug. 16, 2021, Chinese Patent Application Serial No. 202110921315.X, filed on Aug. 11, 2021, and Chinese Patent Application Serial No. 202121875313.3, filed on Aug. 11, 2021, the entire content of which are incorporated herein by reference.

FIELD

The present disclosure relates to the field of all-terrain vehicle technologies, and more particularly to an all-terrain vehicle.

BACKGROUND

All-terrain vehicles, also known as multi-purpose all-terrain vehicles, may travel on various terrains and have good off-road performance. The all-terrain vehicles have been used by more and more people in daily life due to its simplicity, practicality and a variety of uses, and may be driven on any terrain without the restriction of road conditions.

SUMMARY

Embodiments of the present disclosure provide an all-terrain vehicle, which includes: a frame, a cockpit, wheels, suspension assemblies, an engine, a seat support, a cushion, and a storage box. The frame includes a longitudinal beam extending along a front-rear direction of the all-terrain vehicle and a vertical beam extending upwards from the longitudinal beam. The cockpit is arranged in a middle portion of the frame. The wheels are connected to a left side and a right side of the frame, respectively. The suspension assemblies are connected between the wheels and the frame. The engine is disposed on the frame. The seat support is disposed on the frame, and includes a cushion support and a backrest support, the cushion support and the backrest support are located in the cockpit, and the backrest support is located above the cushion support. The cushion is mounted on the cushion support. The storage box is detachably mounted on the backrest support, and the storage box and the cushion form a seat that can be leaned on.

BRIEF DESCRIPTION OF THE DRAWINGS

The above and/or additional aspects and advantages of the present disclosure will become apparent and easy to understand from following descriptions of embodiments in combination with accompanying drawings, in which.

REFERENCE NUMERALS 1 all-terrain vehicle; 60 frame; 61 seat support; 62 cushion support; 63 backrest support; 64 longitudinal beam; 65 vertical beam;

110 cross beam; 111 upper sub-beam; 112 lower sub-beam; 113 first mounting portion; 1131 first pin shaft; 1132 limiting portion; 114 second mounting portion; 115 engaging shaft; 116 mounting support; 12 base plate; 20 cushion;

30 storage box; 31 upper mounting portion; 311 mounting plate; 312 mounting hole; 313 rubber ring; 3131 first connecting portion; 3132 middle connecting portion; 3133 second connecting portion; 32 lower mounting portion; 321 engaging slot; 33 box cover; 34 box body; 35 pivot end; 36 locking portion; 37 locking member; 38 blocking member; 40 holding plate; 50 fastening member; 13 bottom surface; 14 handling portion; 15 handling slot;

70 cockpit; 72 wheel; 74 suspension assembly; 76 engine.

DETAILED DESCRIPTION

Embodiments of the present disclosure are described in detail below, examples of which are illustrated in the drawings. The embodiments described herein with reference to drawings are explanatory, and used to generally understand the present disclosure. The embodiments shall not be construed to limit the present disclosure.

In a related art, a storage box of an all-terrain vehicle is generally located in a cockpit. However, when the storage box is opened, articles scattered in the storage box are easily dropped from the storage box, resulting in unnecessary trouble to the users.

Moreover, a storage space of the all-terrain vehicle is generally located in a middle and a right side of a dashboard, resulting in insufficient storage space of the all-terrain vehicle to meet needs of the users.

An all-terrain vehicle 1 according to embodiments of the present disclosure is described below with reference to FIGS. 1 to 11.

Figure 1:
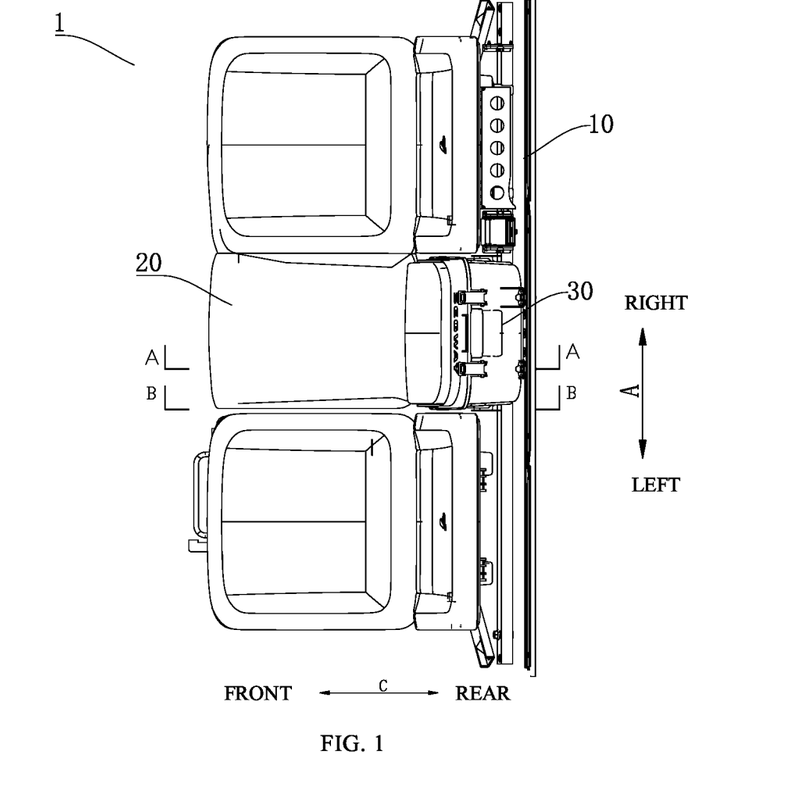
FIG. 1 is a partially schematic view showing an all-terrain vehicle according to an embodiment of the present disclosure.
Figure 2:
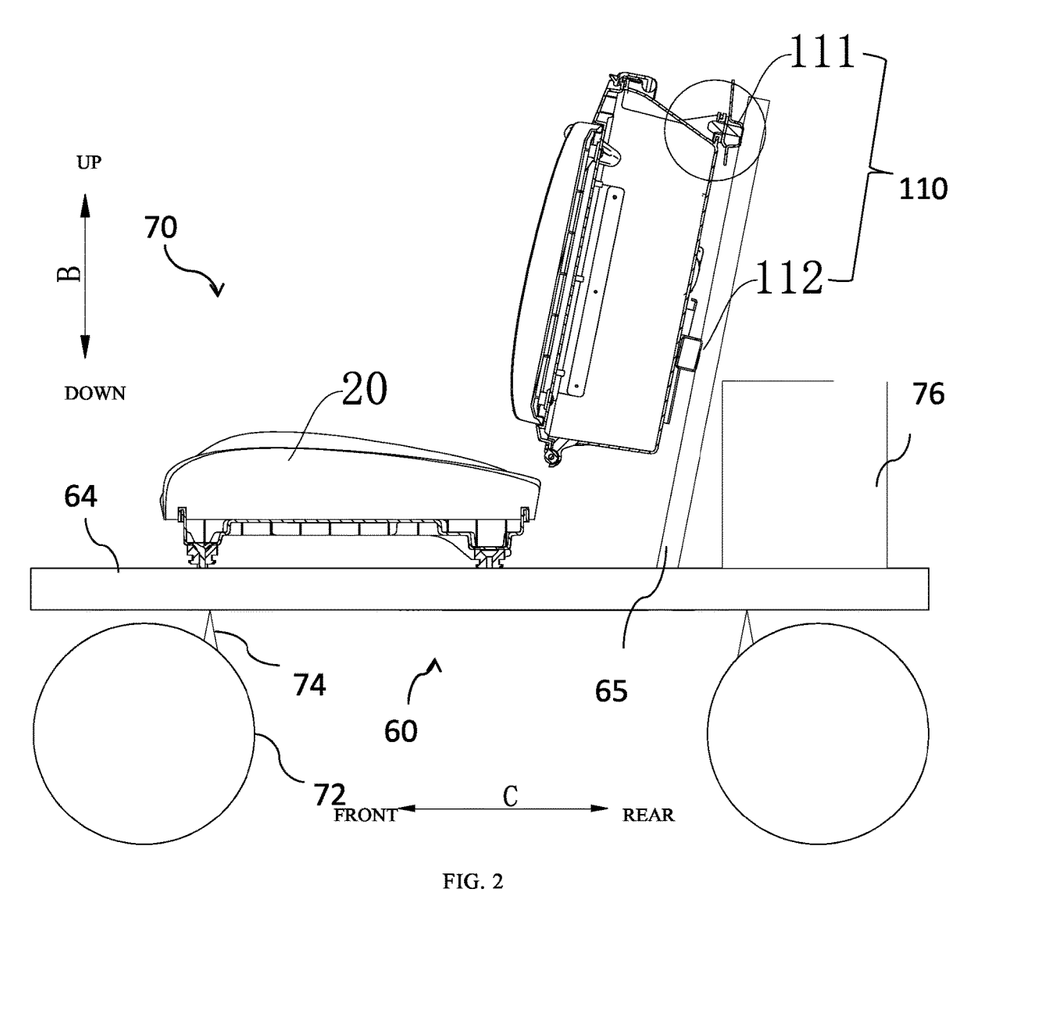
FIG. 2 is a sectional view taken along line A-A in FIG. 1.

FIGS. 1 to 7 show the all-terrain vehicle 1 according to embodiments of the present disclosure. As illustrated in FIG. 2, the all-terrain vehicle 1 includes a frame 60, a cockpit 70, wheels 72, suspension assemblies 74, an engine 76, a seat support 61, a cushion 20, and a storage box 30. The frame 60 includes a longitudinal beam 64 extending along a front-rear direction of the all-terrain vehicle and a vertical beam 65 extending upwards from the longitudinal beam 64. The cockpit 70 is arranged in a middle portion of the frame 60. The wheels 72 are connected to a left side and a right side of the frame 60, respectively. The suspension assemblies 74 are connected between the wheels 72 and the frame 60. The engine 76 is disposed on the frame 60. The seat support 61 includes a backrest support 63 and a cushion support 62, and the backrest support 63 and the cushion support 62 are located in the cockpit 70. The backrest support 63 is located above the cushion support 62.

The cushion 20 is mounted on the cushion support 62. The storage box 30 is detachably mounted on the backrest support 63, and the storage box 30 and the cushion 20 form a seat that can be leaned on. When the storage box 30 is mounted on the backrest support 63, the storage box 30 may be used as a backrest, and may form one seat of the all-terrain vehicle 1 with the cushion 20. This seat may be leaned on. After the storage box 30 is detached from the backrest support 63, the storage box 30 may be used as a storage container that may exist independently of a body of the all-terrain vehicle 1.

The all-terrain vehicle 1 according to embodiments of the present disclosure includes the cushion mounted on the seat support 61 and the storage box detachably mounted on the seat support 61. By providing the storage box, a storage space of the all-terrain vehicle may be increased, and the articles may be loaded and taken out conveniently and quickly through the dismounting of the storage box, which solves a problem of the small storage space of the all-terrain vehicle. In addition, the storage box may be matched with the cushion to form the seat that may be leaned on, which properly utilizes an interior space of the all-terrain vehicle and increases an utilization rate of the interior space of the all-terrain vehicle.

In some embodiments, the backrest support 63 includes a cross beam 110, and the storage box 30 is detachably mounted on the cross beam 110. The cross beam 110 extends in a left-right direction (shown by arrow A in FIG. 1). As illustrated in FIG. 2, the cross beam includes an upper sub-beam 111 and a lower sub-beam 112, and the upper sub-beam 111 is located above the lower sub-beam 112. An up-down direction is shown by arrow B in FIG. 2.

Furthermore, the upper sub-beam 111 is provided with a first mounting portion 113, an upper mounting portion 31 is arranged at a bottom of the storage box 30 corresponding to the first mounting portion 113, and the storage box 30 is detachably mounted on the first mounting portion 113 by the upper mounting portion 31, so that the storage box 30 is detachably mounted on the upper sub-beam 111; and/or, the lower sub-beam 112 is provided with a second mounting portion 114, a lower mounting portion 32 is disposed on a bottom of the storage box 30 corresponding to the second mounting portion 114, the storage box 30 is detachably mounted on the first mounting portion 114 by the lower mounting portion 32, so that the storage box 30 is detachably mounted on the lower sub-beam 112.

That is to say, in some embodiments, the first mounting portion 113 is disposed on the upper sub-beam 111, and the upper mounting portion 31 is disposed on the storage box 30, so that the storage box 30 may be detachably mounted on the first mounting portion 113 through the upper mounting portion 31. Alternatively, the second mounting portion 114 is disposed on the lower sub-beam 112, and the lower mounting portion 32 is disposed on the storage box 30, so that the storage box 30 may be detachably mounted on the second mounting portion 114 through the lower mounting portion 32. Alternatively, the first mounting portion 113 is disposed on the upper sub-beam 111, the second mounting portion 114 is disposed on the lower sub-beam 112, and the upper mounting portion 31 and the lower mounting portion 32 are disposed on the storage box 30, so that the storage box 30 may be detachably mounted on the first mounting portion 113 and the second mounting portion 114 through the upper mounting portion 31 and the lower mounting portion 32. That is, the storage box 30 is detachably mounted on each of the upper sub-beam 111 and the lower sub-beam 112. As illustrated in FIGS. 1 to 7, the upper sub-beam 111 is provided with the first mounting portion 113, the lower sub-beam 112 is provided with the second mounting portion 114, and the storage box 30 is provided with the upper mounting portion 31 and the lower mounting portion 32.

As illustrated in FIGS. 1 to 5, the first mounting portion 113 includes a first pin shaft 1131, and the first pin shaft 1131 is perpendicularly connected to the upper sub-beam 111 and extends in a front-rear direction. The first pin shaft 1131 has a limiting portion 1132. The upper mounting portion 31 includes a mounting plate 311, and the mounting plate 311 defines a mounting hole 312. The upper mounting portion 31 further includes a rubber ring 313. The rubber ring 313 is matched in the mounting hole 312 and has a center through hole coaxial with the mounting hole 312. An inner diameter (that is, a diameter of the central through hole) of the rubber ring 313 is smaller than a size of the limiting portion 1132, and the limiting portion 1132 can elastically deform the rubber ring 313 to pass through the center through hole of the rubber ring 313 from rear to front, and finally press against a front surface of the rubber ring 313 to prevent the limiting portion 1132 from separating from the mounting hole 312.

Figure 3:
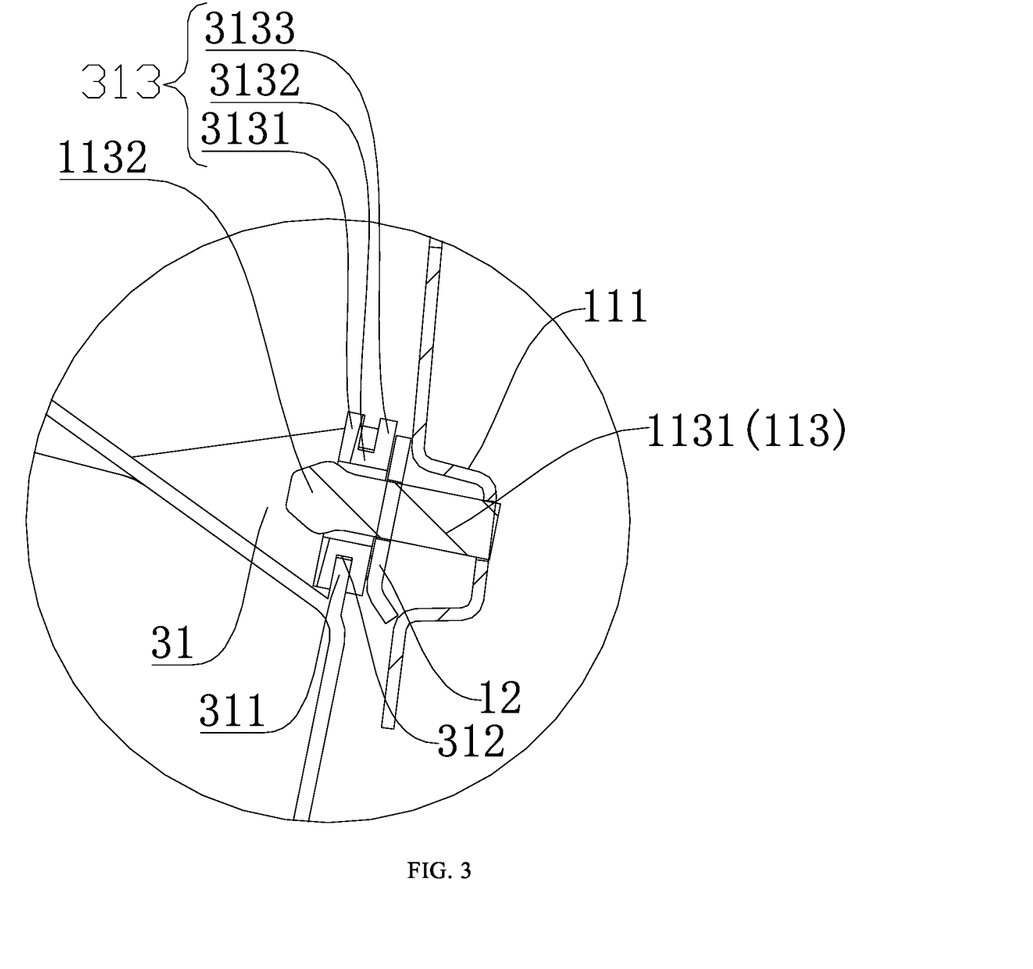
FIG. 3 is a partially enlarged view of FIG. 2.

In some embodiments, as illustrated in FIGS. 2 and 3, the upper sub-beam 111 is located at a rear side of the storage box 30. The upper sub-beam 111 includes a base plate 12. The first pin shaft 1131 passes forwards through the base plate 12 and the mounting hole 312 of the mounting plate 311. The limiting portion 1132 is a front end of the first pin shaft 1131, and a size of the limiting portion 1132 is larger than sizes of remaining parts of the first pin shaft 1131, such that a rear end face of the limiting portion 1132 may press against on the rubber ring 313. The front-rear direction is shown by arrow C in FIGS. 5 and 6.

The rubber ring 313 includes a first connecting portion 3131, a second connecting portion 3133 and a middle connecting portion 3132 for connecting the first connecting portion 3131 and the second connecting portion 3133. The first connecting portion 3131 and the second connecting portion 3133 are arranged oppositely. The mounting plate 311 is sandwiched between the first connecting portion 3131 and the second connecting portion 3133. The middle connecting portion 3132 is fitted in the mounting hole 312 of the mounting plate 311. The first connecting portion 3131 is located in front of the mounting plate 311, and the second connecting portion 3133 is located behind the mounting plate 311. A rear surface of the second connecting portion 3133 presses against a front surface of the base plate 12. The rear end face of the limiting portion 1132 presses against a front surface of the first connecting portion 3131.

When the storage box 30 is mounted on the upper sub-beam 111, the rubber ring 313 may be first mounted on the mounting plate 311 of the upper mounting portion of the storage box 30. That is, the mounting plate 311 is sandwiched between the first connecting portion 3131 and the second connecting portion 313, and the middle connecting portion 3132 is fitted into the mounting hole 312 of the mounting plate 311. Then, the storage box 30 is mounted backwards relative to the upper sub-beam 111, such that the first pin shaft 1131 passes through the central through hole of the rubber ring 313 from rear to front. It could be understood that the first pin shaft 1131 passes through the mounting hole 312 from rear to front in the above-mentioned process. The size of the limiting portion 1132 is larger than the size of the central through hole of the rubber ring 313, and smaller than the size of the mounting hole 312, and thus the limiting portion 1132 may pass through the mounting hole 312 and under an action of thrust, may elastically deform the rubber ring 313 to pass through the central through hole of the rubber ring 313. The rear end of the limiting portion 1132 of the first pin shaft 1131 passing through the central through hole of the rubber ring 313 presses against the front surface of the first connecting portion 3131. Since the size of the limiting portion 1132 is larger than the size of the central through hole of the rubber ring 313, the limiting portion 1132 will not be easily separated from the central through hole of the rubber ring 313.

When the storage box 30 is dismounted from the upper sub-beam 111, a certain forward force is applied to the storage box 30, and the limiting portion 1132 elastically deforms the rubber ring 313 to pass through the central through hole of the rubber ring 313 from front to rear, so that the storage box 30 is dismounted from the upper sub-beam 111. The storage box 30 according to the present embodiment may be mounted on and dismounted from the upper sub-beam 111 quickly and conveniently without mounting or dismounting tools, which has strong practicability.

Figure 4:
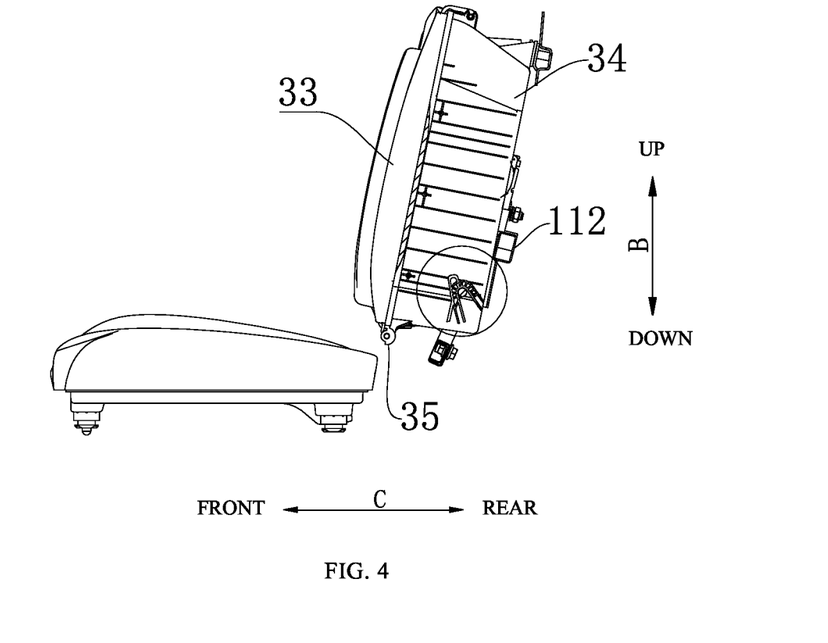
FIG. 4 is a sectional view taken along line B-B in FIG. 1.
Figure 5:
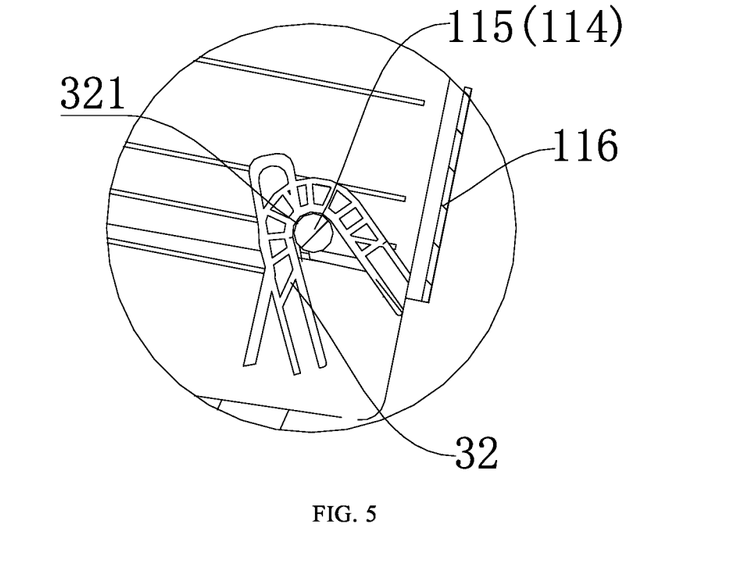
FIG. 5 is a partially enlarged view of FIG. 4.

In the embodiment illustrated in FIGS. 4 and 5, the lower sub-beam 112 is located at the rear side of the storage box 30, and the second mounting portion 114 includes an engaging shaft 115 and a mounting support 116. The engaging shaft 115 is connected to the lower sub-beam 112 by the mounting support 116. The mounting support 116 extends downwards from the lower sub-beam 112, and has one end close to the bottom of the storage box 30 and connected with the engaging shaft 115. The lower mounting portion 32 has an engaging slot 321. The engaging shaft 115 extends in the left-right direction, and is detachably engaged in the engaging slot 321.

In some embodiments, as illustrated in FIG. 5, the mounting support 116 is perpendicularly connected to the lower sub-beam 112, and extends forwards and downwards to be connected with the engaging shaft 115. The engaging shaft 115 is connected to an end face of the mounting support 116 close to the storage box 30, and extends from the mounting support 116 toward a direction close to the storage box 30. The lower mounting portion 32 is a V-shaped jaw, and the jaw defines a V-shaped engaging slot 321. An opening of the engaging slot 321 is oriented backward and downward, and a side of the engaging slot 321 away from the storage box 30 is open. The engaging shaft 115 extends from a side of the mounting support 116 close to the storage box 30 in a direction close to the storage box 30. That is to say, a free end of the engaging shaft 115 is an end close to the storage box 30. When the storage box 30 is mounted on the lower sub-beam 112, the storage box 30 is translated downwards and backwards, such that the engaging shaft 115 is translated from the opening of the engaging slot 321 along a depth direction of the engaging slot 321 relative to the lower mounting portion 32, and is finally engaged at a bottom of the engaging slot 321. When the engaging shaft 115 is engaged at the bottom of the engaging slot 312, the engaging slot 312 is elastically deformed, that is, the engaging slot 312 has an engaging force on the engaging shaft 115, which improves the stability of the storage box 30.

When the storage box 30 is dismounted from the lower sub-beam 112, the storage box 30 is translated upwards and forwards. In this way, the engaging shaft 115 is translated downwards and backwards relative to the lower mounting portion 32 along the depth direction of the engaging slot 321 to be completely separated from the engaging slot 321 finally, so that the storage box 30 is removed from the lower sub-beam 112. The storage box 30 according to the present embodiment may be mounted on and dismounted from the lower sub-beam 112 quickly and conveniently without mounting or dismounting tools, which has strong practicability.

Figure 7:
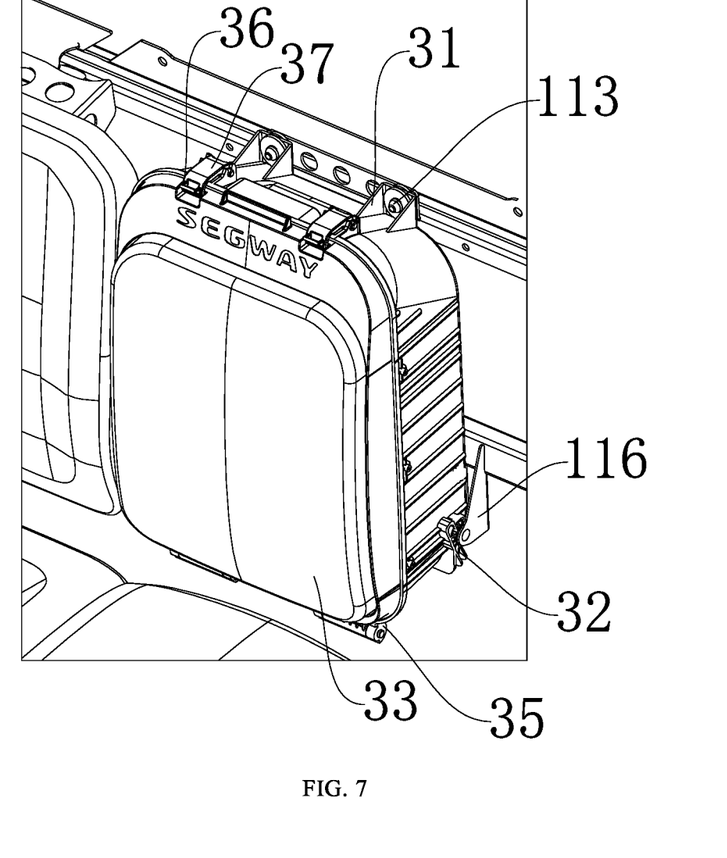
FIG. 7 is a partially schematic view of FIG. 6.

In some embodiments, as illustrated in FIGS. 4 and 7, the storage box 30 includes a box cover 33 and a box body 34. The box cover 33 and the box body 34 cooperatively define a storage cavity, and a top of the box cover 33 faces forwards, to serve as the seat backrest. The top of the box cover 33 refers to an end facing forward. When the users sit on the cushion 20, they may lean on the top of the box cover 33.

Furthermore, as illustrated in FIGS. 4 and 7, an end of the box cover 33 close to the cushion 20 is provided with a pivot end 35, and the box cover 33 is rotatably connected to the box body 34 through a second pin shaft and the pivot end 35. That is, the box cover 33 is hinged to the box body 34, which facilitate placement and removal of the articles.

Furthermore, as illustrated in FIGS. 4 and 7, a locking portion 36 is arranged at an end of the box cover 33 away from the cushion 20, and a locking member 37 is arranged at a position corresponding to the locking portion 36 on the box body 34. The box cover 33 is snap-fitted with the box body 34 through the locking portion 36 and the locking member 37. After the articles are put in or taken out, the box cover 33 and the box body 34 are snap-fitted together by the locking portion 36 and the locking member 37.

Furthermore, the storage box 30 may further include a handling portion 14, and the handling portion 14 is mounted on an upper surface of the storage box 30 to facilitate the mounting and dismounting of the storage box 30.

Figure 6:
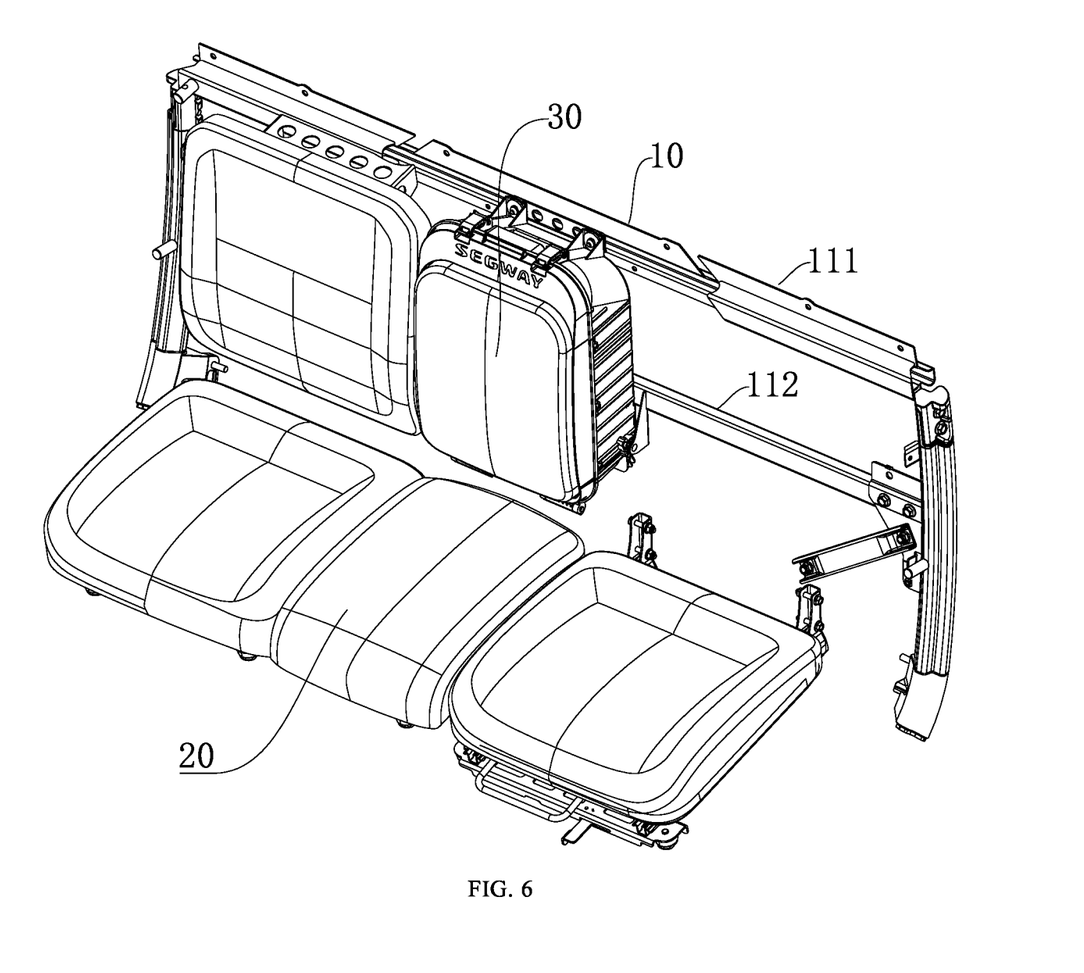
FIG. 6 is a partially schematic view showing an all-terrain vehicle according to an embodiment of the present disclosure.

In the embodiment illustrated in FIG. 6, the storage box 30 is located between two seat backs in the left-right direction. That is to say, the seat formed by the storage box 30 and the cushion 20 is located between a left seat and a right seat of the all-terrain vehicle, and may be used as a spare seat.

The storage box 30 of the all-terrain vehicle 1 according to embodiments of the present disclosure is described below with reference to FIGS. 8 to 11. The storage box 30 is disposed on the all-terrain vehicle 1.

Figure 9:
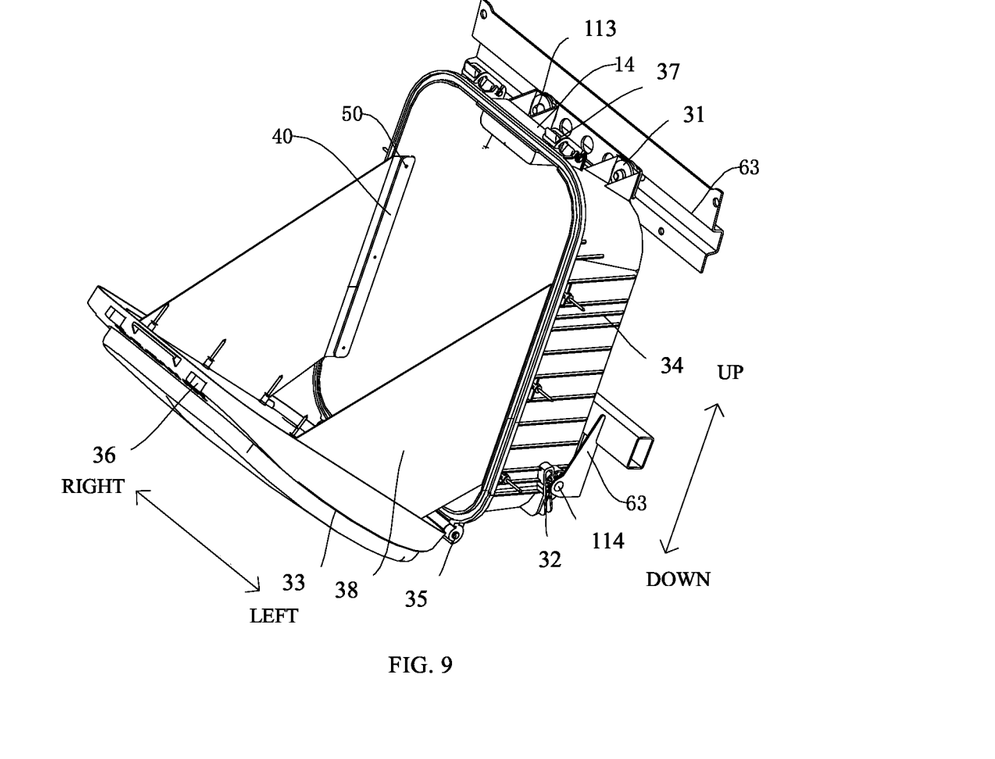
FIG. 9 is a schematic view showing mounting of a storage box and a backrest support from a first angle.

As illustrated in FIG. 9, the storage box 30 of the all-terrain vehicle 1 according to embodiments of the present disclosure includes a box body 34, a box cover 33 and a blocking member 38. The box body 34 is a main storage part of the storage box 30, and the articles may be placed in the box body 34. The box cover 33 may be configured to cover the box body 34 to seal the articles in the storage box 30, thereby preventing the articles from falling. The blocking member 38 may have a blocking effect, and when the storage box 30 is opened, the blocking member 38 may prevent the articles from leaking and falling.

Figure 8:
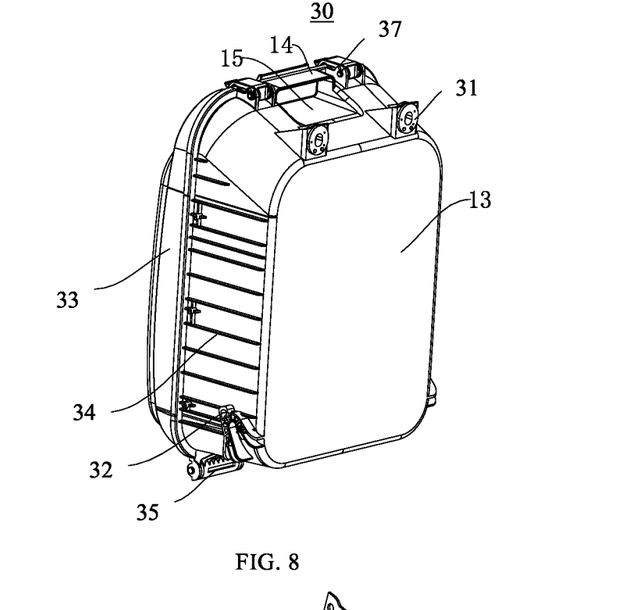
FIG. 8 is a schematic view showing a storage box according to an embodiment of the present disclosure.
Figure 10:
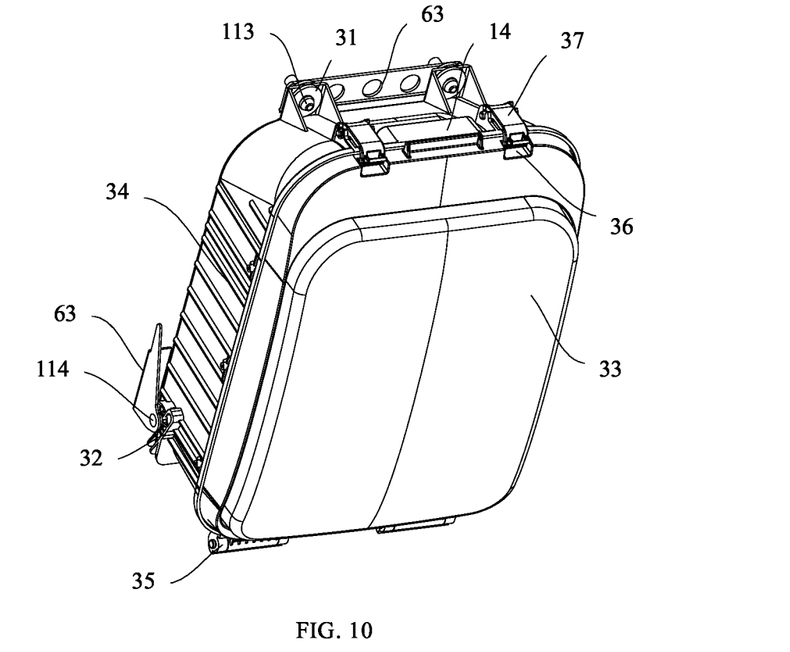
FIG. 10 is a schematic view showing mounting of a storage box and a backrest support from a second angle.

As illustrated in FIGS. 8 to 10, the box cover 33 is fitted on the box body 34, and the box cover 33 and the box body 34 constitute the main body of the storage box 30. The box cover 33 is provided with a pivot end 35, and the box cover 33 is rotatably connected on the box body 34 through the pivot end 35. That is to say, when the storage box 30 is opened or closed, the box cover 33 may be rotated relative to the box body 34 through the pivot end 35, such that the box cover 33 may be opened from the box body 34, or the box cover 33 may be closed on the box body 34. In this way, the storage box 30 may be opened and closed more simple and convenient, which facilitates the operation of the users.

It should be noted that, as illustrated in FIG. 9, the pivoting end 35 is located on a side of the box body 34 in a first direction (that is, the up-down direction shown in FIG. 9). At least one locking member 37 is arranged at a side of the box body 34 opposite to the pivot end 35, and at least one locking portion 36 is arranged at a position of the box cover 33 corresponding to the locking member 37. At least one locking member 37 and at least one locking portion 36 are in locking engagement. That is to say, the side of the box body 34 in the first direction may be fixedly connected to the box cover 33 through the pivot end 35, and the locking member 37 is arranged at the side of the box body 34 opposite to the pivot end 35. The locking member 37 may be in locking engagement with the locking portion 36 corresponding to the locking member 37 and disposed on the box cover 33. In this way, the other side of the box body 34 in the first direction may be connected to the box cover 33 to ensure the connection stability between the box body 34 and the box cover 33. In addition, the box cover 33 may also be opened from the box body 34 through the locking member 37. As illustrated, the locking member 37 may be a lock catch, and the locking portion 36 may be a locking slot or a locking hole.

As illustrated in FIG. 9, the blocking member 38 is connected between the box body 34 and the box cover 33, and located on at least one side of the pivot end 35. The blocking member 38 has an unfolding surface perpendicular to the pivot end 35. When the box cover 33 is open, the blocking member 38 is configured to block at least one side of the box body 34. It could be understood that, due to the different placement angles of the storage box 30 during usage, when the box cover 33 is opened from the box body 34, the articles in the storage box 30 may fall from the gap between the box cover 33 and the box body 34. Moreover, the unfolding surface of the blocking member 38 is perpendicular to the pivoting end 35, such that the blocking member 38 may well prevent the articles from falling from the gap between the box cover 33 and the box body 34, thereby avoiding losses to the user. In at least one embodiment, the blocking members 38 are arranged at both sides of the pivoting end 35, thereby further improving the blocking effect of the blocking members 38.

As illustrated in FIG. 9, the blocking member 38 may have a deformable sheet shape or mesh shape. The blocking member 38 may be deformed, which facilitates the unfolding and folding of the blocking member 38. When the box cover 33 is opened from the box body 34, the blocking member 38 is unfolded, and is stretched finally. When the box cover 33 is closed on the box body 34, the blocking member 38 is folded inside the box body 34. In this way, the blocking member 38 may be used more conveniently, and the blocking member 38 may be easily placed. The blocking member 38 may have the sheet shape or the mesh shape, which is convenient for manufacture and installation of the blocking member 38. The sheet or mesh shape may prevent the articles from falling from the gap between the box cover 33 and the box body 34. In addition, in order to ensure the blocking effect of the blocking member 38, the grids in the mesh shape cannot be too large.

In addition, the blocking member 38 may be a cloth member or a leather member, which have a blocking effect. In addition, the cloth member is lighter in weight to reduce an overall weight of the storage box 30, and the cloth member is relatively cheap to reduce the cost. The leather member has a certain hardness. When the box cover 33 is opened from the box body 34, the blocking member 38 may provide a certain supporting force to the box cover 33, which avoids that the box cover 33 need to be held by the user's hand after the box cover 33 is opened. In addition, the leather member is also easy to fold and store.

According to one embodiment of the present disclosure, as illustrated in FIG. 9, an edge of the blocking member 38 is arranged on a side of the box body 34 in a second direction (that is, the left and right direction illustrated in FIG. 9). When the box cover 33 is opened, the blocking member 38 extends along the first direction, and the second direction is perpendicular to the first direction. The edge of the blocking member 38 is arranged on the side of the box body 34 in the second direction, such that the blocking member 38 may have a blocking effect between the box cover 33 and the box body 34. When the box cover 33 is opened, the blocking member 38 extends along the first direction, such that the blocking member 38 may be distributed between the box cover 33 and the box body 34 as much as possible, thereby widening a blocking range of the blocking member 38 and improving the blocking effect. The second direction is perpendicular to the first direction, which facilitates the arrangement among the blocking member 38, the box cover 33 and the box body 34, such that the blocking member 38 has the blocking effect.

It should be noted that, as illustrated in FIG. 9, a distance from a center of the edge of the blocking member 38 to the side of the box body 34 in the first direction is smaller than a distance from the center of the edge of the blocking member 38 to the other side of the box body 34 in the first direction. When the storage box 30 is placed in the up-down direction as the first direction, the pivoting end 35 is located at a lower portion the box body 34. When the box cover 33 is opened, the articles easily come out from a lower gap between the box cover 33 and the box body 34. The distance from the center of the edge of the blocking member 38 to the side of the box body 34 in the first direction is smaller than the distance from the center of the edge of the blocking member 38 to the other side of the box body 34 in the first direction, such that the lower gap between the box cover 33 and the box body 34 may be reduced as much as possible, thereby reducing a risk of leaking the articles.

In addition, as illustrated in FIG. 9, a length of the edge of the blocking member 38 is d1, a length of a side of the box body 34 along the second direction is d2, and d1 and d2 satisfy relationship: $0.25d2 \leq d1 < d2$. A relationship between the length of the edge of the blocking member 38 and the length of the side of the box body 34 in the second direction is determined as $0.25d2 \leq d1 < d2$, such that the length of the edge of the blocking member 38 relative to the length of the side of the box body 34 in the second direction is not too short. If it is too short, it cannot provide a better blocking effect, and the length of the edge of the blocking member 38 cannot be the same as the length of the side of the box body 34 in the second direction, because it is inconvenient to fix the blocking member 38 on the box body 34, and it is also inconvenient to unfold and fold the blocking member 38.

As illustrated in FIG. 9, a maximum angle of rotation of the box cover 33 relative to the box body 34 is $\alpha$, and $\alpha$ satisfies relationship: $30° < \alpha < 90°$. The maximum angle of rotation of the box cover 33 relative to the box body 34 is the maximum angle that the blocking member 38 may be unfolded. A range of the maximum angle that the blocking member 38 may be unfolded is $30° < \alpha < 90°$. If the angle that the blocking member 38 may be unfolded is too small, it is inconvenient for the user to take out the articles from the storage box 30. If the angle that the blocking member 38 may be unfolded is too large, the blocking member 38 will be uses excessively on the premise that the articles may be taken out from the storage box 30, which easily cause waste.

In addition, as illustrated in FIG. 9, the storage box 30 of the all-terrain vehicle 1 further includes holding plates 40 and fastening members 50. The holding plates 40 are each located on two side edges of the blocking member 38, and the fastening members 50 pass through the holding plate 40 and the edge of the blocking member 38, so as to fix on the box body 34 and the box cover 33 respectively. Alternatively, the two side edges of the blocking member 38 are bonded to the box body 34 and the box cover 33, respectively. That is to say, the blocking member 38 may be fixed on the box body 34 and the box cover 33 in two ways as follows. In a first way, the holding plates 40 may be pressed on two side edges of the blocking member 38 respectively, and then the fastening members 50 pass through the holding plates 40 and the edges of the blocking member 38 to fix on the box body 34 and the box cover 33 respectively. In this fixing way, the blocking member 38 may be fixed on the box body 34 and the box cover 33 more firmly, and it is not easy to loosen between the blocking member 38 and each of the box body 34 and the box cover 33. In a second way, two side edges of the blocking member 38 are directly bonded to the box body 34 and the box cover 33 through an adhesive. The way is simpler and does not require other tools, and thus a structure of the storage box 30 is simpler.

According to one embodiment of the present embodiment, as illustrated in FIGS. 8 to 10, an upper mounting portion 31 and a lower mounting portion 32 are arranged on a bottom edge of the box body 34, and the upper mounting portion 31 and the lower mounting portion 32 are arranged at intervals on the bottom edge of the box body 34. The upper mounting portion 31 is used as a first quick release portion, and the lower mounting portion 32 is used as a second quick release portion. By providing the upper mounting portion 31 and the lower mounting portion 32 at the bottom edge of the box body 34, the box body 34 may connected to the all-terrain vehicle 1 by the upper mounting portion 31 and the lower mounting portion 32, such that the storage box 30 may be fixed on the all-terrain vehicle 1, and the storage box 30 may be detached from the all-terrain vehicle 1 through the upper mounting portion 31 and the lower mounting portion 32 for independent use. By the interval arrangement of the upper mounting portion 31 and the lower mounting portion 32 on the bottom edge of the box body 34, the storage box 30 may be better fixed on the all-terrain vehicle 1, thereby ensuring the stability of the connection between the storage box 30 and the all-terrain vehicle 1.

Furthermore, as illustrated in FIG. 8, one of the upper mounting portion 31 and the lower mounting portion 32 is a snapping portion, and the other of the upper mounting portion 31 and the lower mounting portion 32 is a hooking portion. One of the upper mounting portion 31 and the lower mounting portion 32 may be the snapping portion, and the snapping portion may be snap-fitted with the all-terrain vehicle 1. The other may be the hooking portion, and the hook portion may be hooked with the all-terrain vehicle 1. In this way, the upper mounting portion 31 and the lower mounting portion 32 may be more suitable for the all-terrain vehicle 1, and the connection stability of the storage box 30 and the all-terrain vehicle 1 may also be ensured. As illustrated, the snapping portion may be a snapping hole, and the hooking portion may be a structure with a hanging hole.

In some embodiments, as illustrated in FIG. 8, the upper mounting portion 31 is a hooking portion, and the upper mounting portion 31 is arranged at the bottom of the box body 34 and is on the same side as the locking member 37. The lower mounting portion 32 is a snapping portion, and the lower mounting portion 32 is arranged at the bottom of the box body 34 and is on the same side as the pivot end 35. The upper mounting portion 31 is a hooking portion, and the lower mounting portion 32 is a snapping portion, so that the upper mounting portion 31 is hooked with the all-terrain vehicle 1, and the lower mounting portion 32 is snap-fitted with the all-terrain vehicle 1. The upper mounting portion 31 is arranged at the bottom of the box body 34 and on the same side as the locking member 37, and the lower mounting portion 32 is arranged at the bottom of the box body 34 and on the same side as the pivot end 35, so that the positions of the upper mounting portion 31 and the lower mounting portion 32 may be more suitable for the all-terrain vehicle 1, which may improve the stability of the connection between the storage box 30 and the all-terrain vehicle 1. It should be noted that the bottom of the box body 34 refers to a part opposite to the box cover 33 in the front-rear direction (referring to FIG. 1), i.e., a part of the box body 34 oriented rearwards.

In at least one example, as illustrated in FIG. 8, a bottom surface 13 of the box body 34 is flat. When the storage box 30 is detached from the all-terrain vehicle 1 and used alone, the storage box 30 may also be used as a bench. The bottom surface 13 of the box body 34 is flat, so that the bottom surface 13 of the box body 34 may be placed toward the ground, and the user may sit on the box cover 33. In addition, the box body 34 may be placed more flat to ensure the comfort of the user.

Furthermore, as illustrated in FIG. 8, the handling portion 14 is arranged at the other side of the box body 34 in the first direction, and between the two locking members 37. The handling slot 15 is defined between the handling portion 14 and the box body 34. When the storage box 30 is detached from the all-terrain vehicle 1 to be used alone, the user may put his fingers into the handling slot 15, and then grab the handling portion 14, so as to lift the entire storage box 3 to move the storage box 30, which is convenient for the users to pick the storage box 30 up and to move the storage box 30 more conveniently.

Figure 11:
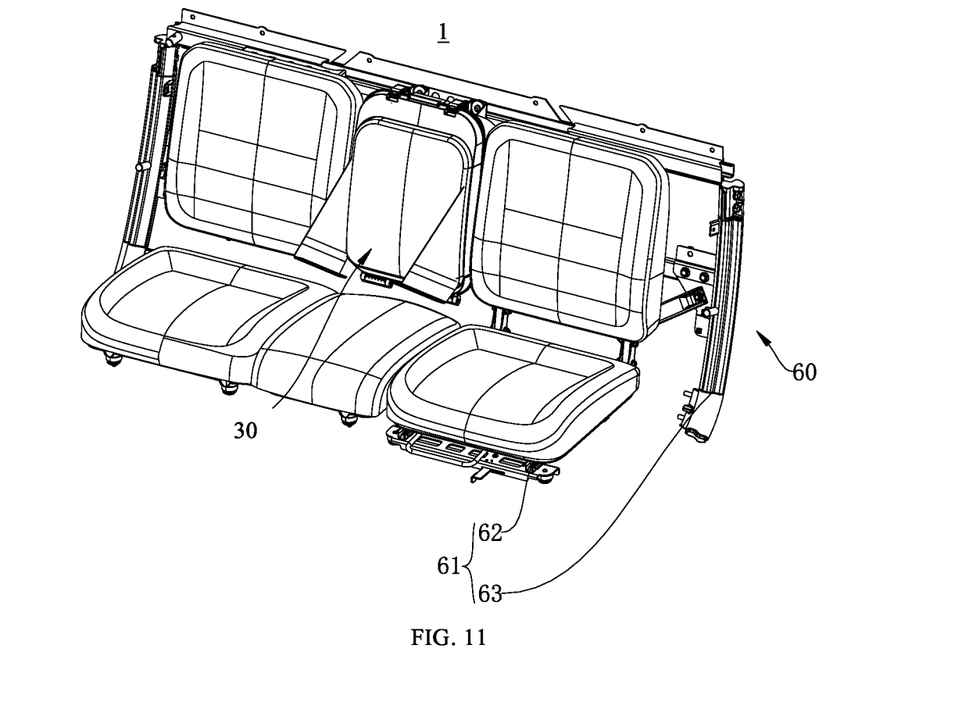
FIG. 11 is a partially schematic view showing an all-terrain vehicle according to another embodiment of the present disclosure.

As illustrated in FIG. 11, the all-terrain vehicle 1 according to embodiments of the present disclosure includes the frame 60 and the storage box 30 in the above-mentioned embodiments. The storage box 30 is disposed on the frame 60. In this way, the storage box 30 may be fixed on the all-terrain vehicle 1. When the user drives the all-terrain vehicle 1, the articles may be placed in the storage box 30, so as to meet the user's load requirements.

The cockpit 70 is defined in the frame 60, and the storage box 30 is arranged in the cockpit 70. The cockpit 70 is defined in the frame 60, so that the user may sit and stand in the cockpit 70 to drive the all-terrain vehicle 1. Due to the limited space of the all-terrain vehicle 1, a front part of the all-terrain vehicle 1 is mainly used for placing the battery, and a rear part of the all-terrain vehicle 1 is mainly used for placing the powertrain. The storage box 30 is arranged in the cockpit 70, so that the space arrangement of the all-terrain vehicle 1 may be more reasonable, and it is also convenient for the user to store and take out the articles.

Furthermore, as illustrated in FIGS. 10 and 11, the cockpit 70 includes the seat support 61. The seat support 61 includes the cushion support 62 and the backrest support 63. The backrest support 63 is located above the cushion support 62. The storage box 30 is disposed on the backrest support 63, and the box cover 33 is arranged on the side of the box body 34 away from the backrest support 63. The cushion support 62 is mainly used for mounting the cushion 20, and the backrest support 63 is mainly used for mounting the backrest. The backrest support 63 is located above the cushion support 62, and the cushion support 62 may provide a certain supporting force to the backrest support 63, so that the mounting of the backrest support 63 may be more stable.

In addition, the storage box 30 is disposed on the backrest support 63. That is to say, when the storage box 30 is mounted on the all-terrain vehicle 1, the storage box 30 may be used as a backrest. The box cover 33 is arranged on the side of the box body 34 away from the backrest support 63, and the box body 34 is configured to connect to the backrest support 63. The backrest support 63 is provided with the first mounting portion 113 and the second mounting portion 114. The first mounting portion 113 is detachably connected to the upper mounting portion 31, and the second mounting portion 114 is detachably connected to the lower mounting portion 32, so that the storage box 30 is detachably connected to the all-terrain vehicle 1. The first mounting portion 113 is used as a third quick release portion, and the second mounting portion 114 is used as a fourth quick release portion. As illustrated, the first mounting portion 113 may be a snapping post, and the second mounting portion 114 may be a hook.

Embodiments of the present disclosure seek to solve at least one of the problems existing in the related art to at least some extent. To this end, the present disclosure is to provide an all-terrain vehicle. The all-terrain vehicle is provided with a detachable storage box on the backrest support to serve as the backrest, which greatly increases the storage space of the all-terrain vehicle while properly utilizing the interior space of the all-terrain vehicle.

The all-terrain vehicle according to the present disclosure includes a frame, a cockpit, wheels, suspension assemblies, an engine, a seat support, a cushion and a storage box. The frame includes a longitudinal beam extending along a front-rear direction of the all-terrain vehicle and a vertical beam extending upwards from the longitudinal beam. The cockpit is arranged in a middle portion of the frame. The wheels are connected to a left side and a right side of the frame, respectively. The suspension assembles are connected between the wheels and the frame. The engine is disposed on the frame. The seat support includes a cushion support and a backrest support. Both the cushion support and the backrest support are located in the cockpit, and the backrest support is located above the cushion support. The cushion is mounted on the cushion support. The storage box is detachably mounted on the backrest support, and the storage box and the cushion form a seat that can be leaned on.

The all-terrain vehicle according to embodiments of the present disclosure includes the cushion mounted on the seat support and the storage box detachably mounted on the seat support. By providing the storage box, a storage space of the all-terrain vehicle may be increased, and the articles may be loaded and taken out conveniently and quickly through the dismounting of the storage box, which solves a problem of the small storage space of the all-terrain vehicle. In addition, the storage box may be matched with the cushion to form the seat that may be leaned on, which properly utilizes the interior space of the all-terrain vehicle and increases the utilization rate of the interior space of the all-terrain vehicle.

In some embodiments, the backrest support includes a cross beam, and the storage box is detachably mounted on the cross beam.

In some embodiments, the cross beam at least includes a lower sub-beam and an upper sub-beam. The upper sub-beam is located above the lower sub-beam. The upper sub-beam is provided with a first mounting portion. An upper mounting portion is arranged at a position of a bottom of the storage box corresponding to the first mounting portion, and the storage box is detachably mounted on the first mounting portion through the upper mounting portion.

In some embodiments, the first mounting portion includes a first pin shaft. The first pin shaft is perpendicularly connected to the upper sub-beam, extends in a front-rear direction and has a limiting portion. The upper mounting portion includes a mounting hole and a rubber ring. The rubber ring is matched in the mounting hole, and has a center through hole coaxial with the mounting hole. The first pin shaft passes through the central through hole of the rubber ring. The limiting portion presses against a front surface of the rubber ring to prevent the limiting portion from separating from the mounting hole.

In some embodiments, the upper mounting portion includes a mounting plate, and the mounting plate defines the mounting hole. The rubber ring includes a first connecting portion, a second connecting portion and a middle connecting portion for connecting the first connecting portion and the second connecting portion. The mounting plate is sandwiched between the first connecting portion and the second connecting portion. The middle connecting portion is fitted in the mounting hole. A rear end face of the limiting portion abuts against a front surface of the first connecting portion.

In some embodiments, the cross beam at least includes a lower sub-beam and an upper sub-beam. The upper sub-beam is located above the lower sub-beam. The lower sub-beam is provided with a second mounting portion. A lower mounting portion is arranged at a position of a bottom of the storage box corresponding to the second mounting portion, and the storage box is detachably mounted on the second mounting portion through the lower mounting portion.

In some embodiments, the cross beam at least includes a lower sub-beam and an upper sub-beam. The upper sub-beam is located above the lower sub-beam. The upper sub-beam is provided with a first mounting portion. An upper mounting portion is arranged at a position of a bottom of the storage box corresponding to the first mounting portion, and the storage box is detachably mounted on the first mounting portion through the upper mounting portion. The lower sub-beam is provided with a second mounting portion. A lower mounting portion is arranged at a position of the bottom of the storage box corresponding to the second mounting portion, and the storage box is detachably mounted on the second mounting portion through the lower mounting portion.

In some embodiments, the second mounting portion includes a mounting support and an engaging shaft. The mounting support is connected to the lower sub-beam. The engaging shaft is connected to the mounting support, and extends in a left-right direction. The lower mounting portion has an engaging slot, and the engaging shaft is detachably engaged in the engaging slot.

In some embodiments, the mounting support is perpendicularly connected to the lower sub-beam and extends forwards and downwards to connect to the engaging shaft. The lower mounting portion is V-shaped jaw, and the jaw defines a V-shaped engaging slot. An opening of the engaging slot is oriented backwards and downwards. The engaging shaft is translated from the opening of the engaging slot along a depth direction of the engaging slot to be engaged at a bottom of the engaging slot.

In some embodiments, the storage box includes a box cover and a box body. The box cover and the box body cooperatively define a storage cavity, and the box cover faces forwards and serves as a backrest of the seat.

In some embodiments, a pivot end is provided at an end of the box cover close to the cushion. The box cover is rotatably connected to the box body through a second pin shaft and the pivot end. A locking portion is arranged at an end of the box cover away from the cushion, and a locking member is arranged at a position of the box body corresponding to the locking portion. The box cover is snap-fitted with the box body through the locking portion and the locking member.

In some embodiments, the all-terrain vehicle includes three seats arranged side by side in the cockpit. The storage box serves as a backrest of a middle one of the seats.

In some embodiments, the storage box includes a box body, a box cover and a blocking member. The box cover is provided with a pivot end, and the box cover is rotatably connected on the box body through the pivot end. The blocking member is connected between the box body and the box cover, and arranged on at least one side of the pivot end. The blocking member is configured to have an unfolding surface perpendicular to the pivot end when the box cover is open, to block a gap between the box cover and the box body on at least one side of the box body.

In the storage box of the all-terrain vehicle of the present disclosure, the blocking member is connected between the box body and the box cover, and located on at least one side of the pivoting end. When the box cover is open from the box body, the articles in the storage box may fall from the gap between the box cover and the box body. The blocking member may well prevent the articles from falling from the gap between the box cover and the box body, thereby avoiding losses to the user.

In some examples of the present disclosure, the blocking member has a deformable sheet shape or a mesh shape.

In some examples of the present disclosure, the pivot end is arranged on a side of the box body in a first direction, and an edge of the blocking member is located on a side of the box body in a second direction. The blocking member extends along the first direction when the box cover is opened. The second direction is perpendicular to the first direction.

In some examples of the present disclosure, a length of the edge of the blocking member is d1, a length of a side of the box body along the second direction is d2, and d1 and d2 satisfy relationship: 0.25d2≤d1<d2.

In some examples of the present disclosure, a maximum angle of rotation of the box cover relative to the box body is α, and α satisfies relationship: 30°<α<90°.

In some examples of the present disclosure, the storage box of the all-terrain vehicle further includes holding plates and fastening members. The holding plates are each arranged at two side edges of the blocking member. The fastening members pass through the holding plates and the edges of the blocking member, to fix on the box body and the box cover. Alternatively, the two side edges of the blocking member are each bonded to the box body and the box cover.

In some examples of the present disclosure, a bottom edge of the box body is provided with a first quick release portion and a second quick release portion arranged at intervals.

In some examples of the present disclosure, at least one locking member is arranged on a side of the box body opposite to the pivot end, and at least one locking portion is arranged at a position of the box cover corresponding to the locking member.

In some examples of the present disclosure, the pivoting end is located on one side of the box body along the first direction. The first quick release portion is a hooking portion, and is arranged at the bottom of the box body and on the same side as the locking member. The second quick release portion is a snapping portion, and is arranged at the bottom of the box body and on the same side as the pivot end.

Additional aspects and advantages of the present disclosure are given in part in the above description, become apparent in part from the above descriptions, or be learned from the practice of the embodiments of the present disclosure.

In the description of the present disclosure, it should be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation as then described or as shown in the drawings under discussion. These relative terms are only for convenience of description and do not indicate or imply that the device or element referred to must have a particular orientation, or be constructed and operated in a particular orientation. Thus, these terms shall not be construed as limitation on the present disclosure.

In addition, terms such as "first" and "second" are used herein for purposes of description and are not intended to indicate or imply relative importance or significance. Thus, the feature defined with "first" and "second" may include one or more this feature. In the description of the present disclosure, "a plurality of" means at least two, such as two, three and so on, unless specified otherwise.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

In the description of this specification, the reference term "an embodiment," "some embodiments," "an example," "a specific example," or "some examples," means that a particular feature, structure, material, or characteristic described in connection with the embodiment or example is included in at least one embodiment or example of the present disclosure. In this specification, the above-mentioned term in various places throughout this specification are not necessarily referring to the same embodiment or example of the present disclosure. Furthermore, the particular features, structures, materials, or characteristics may be combined in any suitable manner in one or more embodiments or examples.

Although embodiments of the present disclosure have been shown and described, it would be appreciated by those skilled in the art that the above embodiments of the present disclosure are explanatory and are not used to limit the present disclosure, and any various changes, modifications, alternatives and variations may be made in the embodiments without departing from the scope of the present disclosure.

What is claimed is:

1. An all-terrain vehicle, comprising:
a frame comprising a longitudinal beam extending along a front-rear direction of the all-terrain vehicle and a vertical beam extending upwards from the longitudinal beam;
a cockpit arranged in a middle portion of the frame;
wheels connected to a left side and a right side of the frame, respectively;
suspension assemblies connected between the wheels and the frame;
an engine disposed on the frame;
a seat support disposed on the frame, the seat support comprising a cushion support and a backrest support, the cushion support and the backrest support being arranged in the cockpit, the backrest support being arranged above the cushion support;
a cushion mounted on the cushion support; and
a storage box detachably mounted on the backrest support, the storage box and the cushion forming a seat that can be leaned on.

2. The all-terrain vehicle according to claim 1, wherein the backrest support comprises a cross beam, and the storage box is detachably mounted on the cross beam.

3. The all-terrain vehicle according to claim 2, wherein the cross beam at least comprises a lower sub-beam and an upper sub-beam located above the lower sub-beam;
the upper sub-beam is provided with a first mounting portion, an upper mounting portion is arranged at a position of a bottom of the storage box corresponding to the first mounting portion, and the storage box is detachably mounted on the first mounting portion through the upper mounting portion.

4. The all-terrain vehicle according to claim 3, wherein the first mounting portion comprises a first pin shaft perpendicularly connected to the upper sub-beam and extending in the front-rear direction, the first pin shaft has a limiting portion; the upper mounting portion comprises a mounting hole and a rubber ring matched in the mounting hole, and the rubber ring has a center through hole coaxial with the mounting hole; and the first pin shaft passes through the central through hole of the rubber ring, the limiting portion presses against a front surface of the rubber ring to prevent the limiting portion from separating from the mounting hole.

5. The all-terrain vehicle according to claim 4, wherein the upper mounting portion comprises a mounting plate, the mounting plate defines the mounting hole; the rubber ring comprises a first connecting portion, a second connecting portion, and a middle connecting portion for connecting the first connecting portion and the second connecting portion, the mounting plate is sandwiched between the first connecting portion and the second connecting portion, the middle connecting portion is fitted in the mounting hole, and a rear end face of the limiting portion abuts against a front surface of the rubber ring to prevent the limiting portion from separating from the mounting hole.

6. The all-terrain vehicle according to claim 2, wherein the cross beam at least comprises a lower sub-beam and an upper sub-beam located above the lower sub-beam:
the lower sub-beam is provided with a second mounting portion; a lower mounting portion is arranged at a position of a bottom of the storage box corresponding to the second mounting portion, and the storage box is detachably mounted on the second mounting portion through the lower mounting portion.

7. The all-terrain vehicle according to claim 2, wherein the cross beam comprises at least a lower sub-beam and an upper sub-beam located above the lower sub-beam;
the upper sub-beam is provided with a first mounting portion, an upper mounting portion is arranged at a position of a bottom of the storage box corresponding to the first mounting portion, and the storage box is detachably mounted on the first mounting portion through the upper mounting portion; and the lower sub-beam is provided with a second mounting portion, a lower mounting portion is arranged at a position of the bottom of the storage box corresponding to the second mounting portion, and the storage box is detachably mounted on the second mounting portion through the lower mounting portion.

8. The all-terrain vehicle according to claim 6, wherein the second mounting portion comprises a mounting support connected to the lower sub-beam; and an engaging shaft connected to the mounting support, extending in a left-right direction, and detachably engaged in an engaging slot defined in the lower mounting portion.

9. The all-terrain vehicle according to claim 8, wherein the mounting support is perpendicularly connected to the lower sub-beam and extends forwards and downwards to connect to the engaging shaft, the lower mounting portion is V-shaped jaw defining a V-shaped engaging slot, and an opening of the engaging slot is oriented backwards and downwards; and the engaging shaft is configured to translate from the opening of the engaging slot along a depth direction of the engaging slot to be engaged at a bottom of the engaging slot.

10. The all-terrain vehicle according to claim 1, wherein the storage box comprises a box cover and a box body, the box cover and the box body cooperatively define a storage cavity, and the box cover faces forwards and serves as a backrest of the seat.

11. The all-terrain vehicle according to claim 10, wherein a pivot end is provided at an end of the box cover close to the cushion; the box cover is rotatably connected to the box body through a second pin shaft and the pivot end; a locking portion is arranged at an end of the box cover away from the cushion; a locking member is arranged at a position of the box body corresponding to the locking portion; and the box cover is snap-fitted with the box body through the locking portion and the locking member.

12. The all-terrain vehicle according to claim 1, comprising three seats arranged side by side in the cockpit, wherein the storage box serves as a backrest of a middle one of the three seats.

13. The all-terrain vehicle according to claim 1, wherein the storage box comprises:
a box body;
a box cover provided with a pivot end and rotatably connected on the box body through the pivot end;
a blocking member connected between the box body and the box cover and arranged on at least one side of the pivot end, the blocking member being configured to have an unfolding surface perpendicular to the pivot end when the box cover is open, to block a gap between the box cover and the box body on at least one side of the box body.

14. The all-terrain vehicle according to claim 13, wherein the blocking member has a deformable sheet shape or a mesh shape.

15. The all-terrain vehicle according to claim 13, wherein the pivot end is arranged on a side of the box body in a first direction, and an edge of the blocking member is located on a side of the box body in a second direction; the blocking member extends along the first direction when the box cover is opened; and the second direction is perpendicular to the first direction.

16. The all-terrain vehicle according to claim 15, wherein a length of the edge of the blocking member is d1, a length of the side of the box body along the second direction is d2, and d1 and d2 satisfy relationship: $0.25d2 \leq d1 \leq d2$.

17. The all-terrain vehicle according to claim 13, wherein a maximum angle of rotation of the box cover relative to the box body is $\alpha$, and $\alpha$ satisfies relationship; $30° < \alpha < 90°$.

18. The all-terrain vehicle according to claim 13, wherein the storage box further comprises holding plates and fastening members; the holding plates are each arranged at two side edges of the blocking member; and the fastening members pass through the holding plates and the two side edges of the blocking member to fix on the box body and the box cover; or the two side edges of the blocking member are each bonded to the box body and the box cover.

19. The all-terrain vehicle according to claim 13, wherein a bottom edge of the box body is provided with a first quick release portion and a second quick release portion arranged at intervals.

20. The all-terrain vehicle according to claim 19, wherein at least one locking member is located on a side of the box body opposite to the pivot end, and at least one locking portion is located at a position of the box cover corresponding to the locking member.

* * * * *